United States Patent
Razavi Majomard et al.

(10) Patent No.: US 11,115,151 B1
(45) Date of Patent: Sep. 7, 2021

(54) METHOD AND APPARATUS FOR FAST RETRAINING OF ETHERNET TRANSCEIVERS BASED ON TRICKLING ERROR

(71) Applicant: Aquantia Corporation, San Jose, CA (US)

(72) Inventors: Seid Alireza Razavi Majomard, San Carlos, CA (US); Hossein Sedarat, San Jose, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/362,500

(22) Filed: Mar. 22, 2019

(51) Int. Cl.
*H04L 1/00* (2006.01)
*H04L 25/02* (2006.01)

(52) U.S. Cl.
CPC .......... *H04L 1/0041* (2013.01); *H04L 1/0003* (2013.01); *H04L 1/0046* (2013.01); *H04L 1/0057* (2013.01); *H04L 25/023* (2013.01)

(58) Field of Classification Search
None
See application file for complete search history.

(56) References Cited

U.S. PATENT DOCUMENTS

| | | | |
|---|---|---|---|
| 3,506,906 A | 4/1970 | Nestor | |
| 3,671,859 A | 6/1972 | Miller | |
| 5,680,400 A | 10/1997 | York | |
| 5,832,032 A | 11/1998 | Overbury | |
| 5,995,566 A | 11/1999 | Rickard et al. | |
| 5,995,567 A | 11/1999 | Cioffi et al. | |
| 6,052,385 A | 4/2000 | Kanerva | |
| 6,052,420 A | 4/2000 | Yeap | |
| 6,081,523 A | 6/2000 | Merchant et al. | |
| 6,101,216 A * | 8/2000 | Henderson | H04L 27/0002 375/222 |
| 6,121,890 A | 8/2000 | Rao | |
| 6,137,829 A | 10/2000 | Betts | |
| 6,195,360 B1 | 2/2001 | Raza et al. | |
| 6,345,071 B1 | 2/2002 | Hamdi | |
| 6,377,640 B2 | 4/2002 | Trans | |
| 6,385,315 B1 | 5/2002 | Viadella et al. | |
| 6,467,092 B1 | 10/2002 | Geile et al. | |
| 6,532,277 B2 | 3/2003 | Ulanskas et al. | |
| 6,690,739 B1 | 2/2004 | Mui | |
| 6,711,207 B1 | 3/2004 | Amrany et al. | |
| 6,734,659 B1 | 5/2004 | Fortner | |

(Continued)

FOREIGN PATENT DOCUMENTS

WO    WO2000/021204    4/2000

OTHER PUBLICATIONS

U.S. Appl. No. 12/977,844, filed Dec. 23, 2010, Sedarat.

(Continued)

*Primary Examiner* — Adnan Baig

(57) ABSTRACT

A method of operation for an Ethernet transceiver is disclosed. The method includes operating the Ethernet transceiver in a data mode, and triggering a fast retrain sequence of steps based on trickling error information. The triggering includes detecting error information, averaging the detected error information over a time interval to generate the trickling error information, comparing the averaged detected error information to a selected threshold value, and initiating the fast retrain sequence of steps based on the comparing.

15 Claims, 4 Drawing Sheets

(56) References Cited

U.S. PATENT DOCUMENTS

| | | |
|---|---|---|
| 6,922,448 B1 | 7/2005 | Jacobsen et al. |
| 6,924,724 B2 | 8/2005 | Grilo et al. |
| 6,959,056 B2 | 10/2005 | Yeap et al. |
| 7,026,730 B1 | 4/2006 | Marshall et al. |
| 7,027,407 B2 | 4/2006 | Diepstraten et al. |
| 7,106,833 B2 | 9/2006 | Kerpez |
| 7,113,491 B2 | 9/2006 | Graziano et al. |
| 7,123,117 B2 | 10/2006 | Chen et al. |
| 7,158,563 B2 | 1/2007 | Ginis et al. |
| 7,200,180 B2 | 4/2007 | Verbin et al. |
| 7,315,592 B2 | 1/2008 | Tsatsanis et al. |
| 7,324,511 B2 | 1/2008 | Nishihara |
| RE40,149 E | 3/2008 | Vitenberg |
| 7,353,007 B2 | 4/2008 | Carballo et al. |
| 7,492,840 B2 | 2/2009 | Chan |
| 7,525,992 B1 | 4/2009 | Shachal |
| 7,567,620 B2 | 7/2009 | Rozental |
| 7,593,431 B1 | 9/2009 | Lo et al. |
| 7,646,699 B2 | 1/2010 | Tellado et al. |
| 7,656,956 B2 | 2/2010 | King |
| 7,664,254 B2 | 2/2010 | Bostoen et al. |
| 7,693,240 B2 | 4/2010 | Mezer |
| 7,697,408 B2 | 4/2010 | Schneider et al. |
| 7,708,595 B2 | 5/2010 | Chow et al. |
| 7,720,075 B2 | 5/2010 | Costo |
| 7,738,482 B2 | 6/2010 | Thousand et al. |
| 7,782,852 B2 | 8/2010 | Tellado et al. |
| 7,860,020 B2 | 12/2010 | Taich et al. |
| 7,936,778 B2 | 5/2011 | Ungerboeck et al. |
| 8,112,646 B2 | 2/2012 | Tsai |
| 8,196,016 B1 | 6/2012 | Langner et al. |
| 8,201,005 B2 | 6/2012 | Wertheimer et al. |
| 8,276,013 B2 | 9/2012 | Diab et al. |
| 8,284,799 B2 | 10/2012 | Diab |
| 8,320,411 B1 | 11/2012 | Sedarat et al. |
| 8,442,099 B1 | 5/2013 | Sederat |
| 8,520,562 B2 | 8/2013 | Taich et al. |
| 8,665,902 B2 | 3/2014 | Powell |
| 8,804,582 B1 | 8/2014 | Taich et al. |
| 8,804,793 B2 | 8/2014 | Wu |
| 8,804,798 B2 | 8/2014 | Malkin et al. |
| 8,854,986 B1 | 10/2014 | Langner |
| 9,001,872 B1 | 4/2015 | Farjadrad |
| 9,130,695 B1 | 9/2015 | Dalmia |
| 9,294,355 B2 | 3/2016 | Edwards |
| 9,893,756 B1 | 2/2018 | Sedarat |
| 10,069,521 B1 | 9/2018 | Farjadrad |
| 10,148,508 B1 | 12/2018 | Sedarat |
| 2002/0006167 A1 | 1/2002 | McFarland |
| 2002/0119783 A1 | 8/2002 | Bourlas et al. |
| 2002/0180547 A1 | 12/2002 | Staszewski |
| 2003/0026282 A1* | 2/2003 | Gross ............... H04L 27/0002 |
| | | 370/430 |
| 2003/0040298 A1 | 2/2003 | Heatley |
| 2003/0156603 A1 | 8/2003 | Rakib |
| 2003/0186591 A1 | 10/2003 | Jensen et al. |
| 2003/0223505 A1 | 12/2003 | Verbin et al. |
| 2004/0023631 A1 | 2/2004 | Deutsch et al. |
| 2004/0114503 A1 | 6/2004 | Schneider et al. |
| 2004/0184810 A1 | 9/2004 | Spilman et al. |
| 2004/0239465 A1 | 12/2004 | Chen et al. |
| 2005/0025266 A1 | 2/2005 | Chan |
| 2005/0030808 A1 | 2/2005 | Brown et al. |
| 2005/0053229 A1 | 3/2005 | Tsatsanis et al. |
| 2005/0055467 A1 | 3/2005 | Campana et al. |
| 2005/0058152 A1 | 3/2005 | Oksanen et al. |
| 2005/0152466 A1 | 7/2005 | Maltsev et al. |
| 2005/0245216 A1 | 11/2005 | Boos |
| 2005/0259685 A1 | 11/2005 | Chang et al. |
| 2006/0109784 A1 | 5/2006 | Weller et al. |
| 2006/0153106 A1 | 7/2006 | Laakso et al. |
| 2006/0153307 A1 | 7/2006 | Brown et al. |
| 2006/0159186 A1 | 7/2006 | King |
| 2006/0215561 A1 | 9/2006 | Wang et al. |
| 2006/0274824 A1 | 12/2006 | Kroninger |
| 2007/0076722 A1 | 4/2007 | Ungerboeck et al. |
| 2007/0081475 A1 | 4/2007 | Telado |
| 2007/0140289 A1 | 6/2007 | Tellado et al. |
| 2007/0162818 A1 | 7/2007 | Shen et al. |
| 2007/0192505 A1 | 8/2007 | Dalmia |
| 2007/0248024 A1 | 10/2007 | Conway et al. |
| 2008/0034137 A1 | 2/2008 | Whitby-Strevens |
| 2008/0089433 A1 | 4/2008 | Cho et al. |
| 2008/0187028 A1 | 8/2008 | Lida |
| 2008/0294919 A1 | 11/2008 | Lida et al. |
| 2008/0310432 A1 | 12/2008 | Ranjan |
| 2009/0080459 A1 | 3/2009 | Barkan et al. |
| 2009/0097389 A1 | 4/2009 | Diab |
| 2009/0097401 A1 | 4/2009 | Diab |
| 2009/0097442 A1 | 4/2009 | Diab |
| 2009/0150745 A1 | 6/2009 | Langner et al. |
| 2009/0154455 A1 | 6/2009 | Diab |
| 2009/0187778 A1 | 7/2009 | Diab |
| 2009/0148161 A1 | 8/2009 | Walker |
| 2009/0282277 A1 | 11/2009 | Sedarat |
| 2010/0046543 A1 | 2/2010 | Parnaby |
| 2010/0054315 A1 | 3/2010 | Huang |
| 2010/0075704 A1 | 3/2010 | McHenry et al. |
| 2010/0111202 A1 | 5/2010 | Schley-May et al. |
| 2010/0115295 A1 | 5/2010 | Diab |
| 2010/0188980 A1 | 7/2010 | Desai et al. |
| 2010/0220612 A1* | 9/2010 | Ikematsu ............ H04L 43/0847 |
| | | 370/252 |
| 2010/0322105 A1 | 12/2010 | Diab |
| 2011/0051620 A1 | 3/2011 | Taich |
| 2011/0206042 A1 | 8/2011 | Rarrab |
| 2011/0249686 A1 | 10/2011 | Langner |
| 2011/0249687 A1 | 10/2011 | Diab |
| 2011/0261814 A1 | 10/2011 | Matthews |
| 2012/0063295 A1 | 3/2012 | Bliss |
| 2012/0106345 A1 | 5/2012 | Diab |
| 2012/0170591 A1 | 7/2012 | Diab et al. |
| 2012/0188894 A1 | 7/2012 | Huschke et al. |
| 2013/0070823 A1 | 3/2013 | Malkin et al. |
| 2014/0258813 A1 | 9/2014 | Lusted |
| 2016/0308742 A1* | 10/2016 | Bains ............... H04L 25/03006 |

OTHER PUBLICATIONS

U.S. Appl. No. 14/961,810, Sedarat.
Ken Christense et al., IEEE 802.3az The Road to Energy Efficient Ethernet, IEEE Communications Magazine, Nov. 2010, 7 Pages.
Hugh Barrass, EEE Exchange of Management Information, IEEE 802.3az EEE Task Force, Mar. 2009, Vancouver, British Columbia, 11 Pages.
Zimmerman et al., IEEE Power Backoff, Solarflare, Teranetics, Feb. 19, 2005, 12 pages.
Zimmerman et al., IEEE Power Backoff, Mar. 15, 2005, 16 pages.
Nariman Yousefi, Multi Rate PHY, IEEE Meeting Slides, Jul. 2003, 14 pages.
Zhang et al; IEEE Apr. 2010; pp. 843-855; "An Efficient 10GBASE-T Ethernet LDPC Decoder Design with Low Error Floors".
Mankar et al.; ACEEE, Proc of Intl. Conf. on Recent Trends in Information, Telecommunication and Computing, ITC; 5 pages; "Algorithms and Architectures for Reduced Complexity LDPC Decoding".

\* cited by examiner

METHOD AND APPARATUS FOR FAST RETRAINING OF ETHERNET TRANSCEIVERS BASED ON TRICKLING ERROR

TECHNICAL FIELD

The disclosure herein relates to communications systems, and more specifically to high-speed Ethernet systems and methods.

BACKGROUND

Modern high-speed Ethernet protocols, such as 10GBASE-T and NBASE-T, rely on adaptive filters and digital signal processing circuitry to address noise that may affect the Ethernet link. Prior to operation of the link in an "online" mode, the link undergoes autonegotiation and a full training sequence to place the link in an initial state that's capable of overcoming the noise. While operating in the "online" mode, the link may briefly go "offline" due to extraneous alien crosstalk or other noise. Fast retrain sequences may bring the link back online in a very short period of time without the need to carry out a full training sequence.

Conventional standardized fast retraining sequences are generally triggered by a predefined error threshold, such as a given number of consecutive frame errors, regardless of the time interval over which those consecutive errors occur. While such a trigger may be beneficial in some situations, the lack of flexibility in triggering based on other forms of error information over a selectable time interval may be undesirable.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Figure 1:
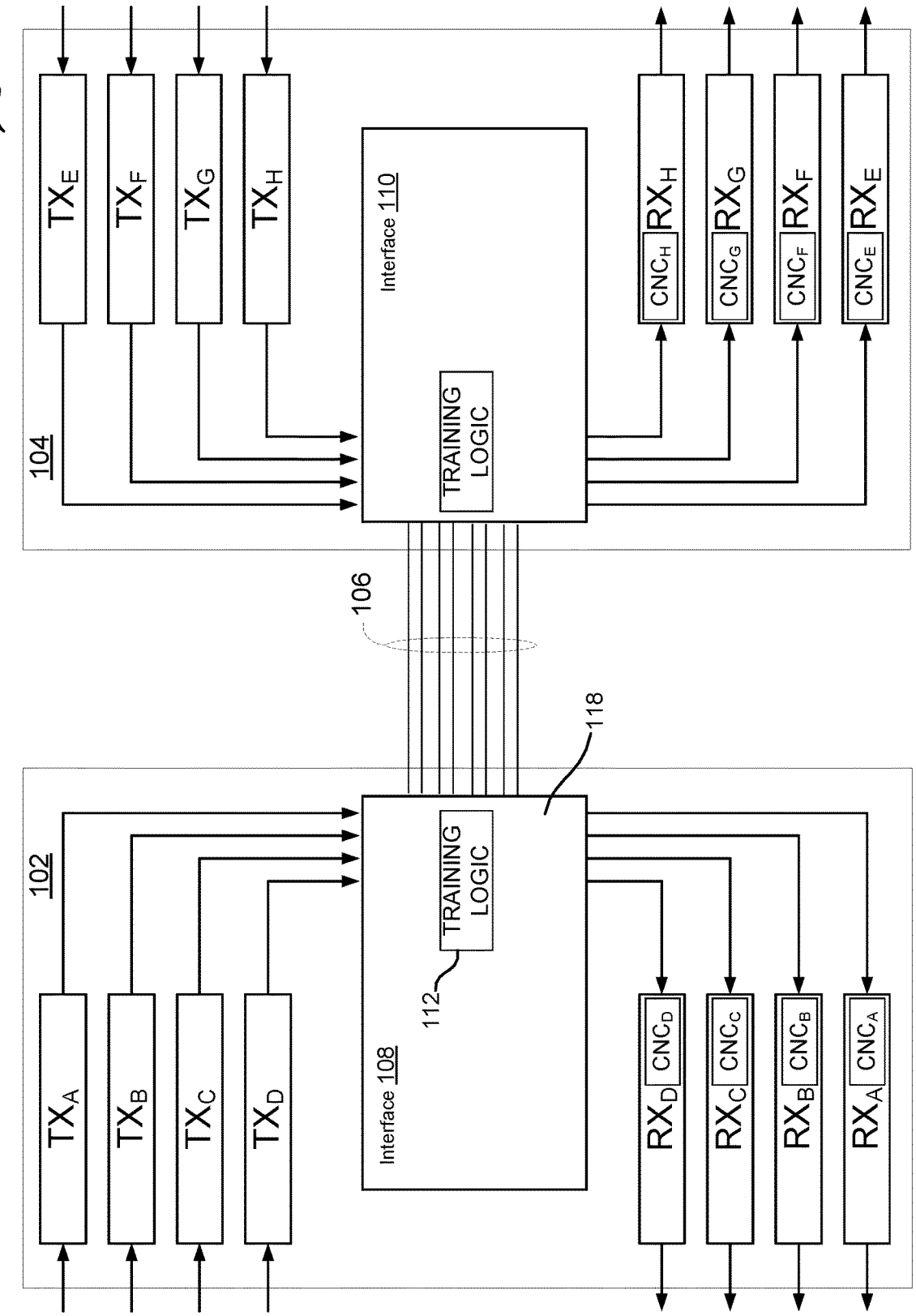
FIG. 1 illustrates a high-level transmitter/receiver (transceiver) channel architecture for an NBASE-T Ethernet transceiver.

FIG. 1 is a block diagram illustrating one embodiment of a communication system 100. The system includes a first transceiver integrated circuit (IC) or chip 102 and a second transceiver chip 104 that can communicate with each other. The first transceiver 102 includes "transceiver components" including one or more transmitters $TX_A$-$TX_D$ and one or more receivers $RX_A$-$RX_D$. Similarly, the second transceiver 104 includes various transceiver components including one or more transmitters $TX_E$-$TX_H$ and one or more receivers $RX_E$-$RX_H$. The transmitters $TX_A$-$TX_H$ shown in FIG. 1 can be considered individual "transmitters," as typically referenced herein, or can be considered individual transmitter channels which a transmitter block within the transceiver can independently transmit signals on. Similarly, receivers $RX_A$-$RX_H$ can be considered individual "receivers," as typically referenced herein, or can alternately be considered individual receiver channels which a receiver block within the transceiver can independently receive signals on. The transmitters and receivers are connected to one or more components (not shown) of a computer system, device, processor, or other "controller" associated with each respective transceiver which wants to communicate data over the communication network. For example, the transmitters receive data and control signals from the controller connected to the first transceiver 102 in order to send the data over the network to other transceivers and controllers, while the receivers receive data from other transceivers and controllers via the network in order to provide the data to the controller connected to the first transceiver 102.

The first transceiver chip 102 can communicate with the second transceiver chip 104 over one or more communication channels of a communication link 106. In one embodiment, such as one similar to the 10GBASE-T and NBASE-T Ethernet standards, four communication channels are provided on the communication link 106, each channel including a twisted pair cable. Thus, in that standard, there are four transmitters TX and four corresponding receivers RX provided in each of the transceivers 102 and 104, each transmitter associated with one of the local near-end receivers in the same transceiver, and each such transmitter/receiver pair dedicated to one channel used for duplex communication. A transmitter/receiver pair in the first transceiver 102 communicates across a channel of the link 106 to a far-end transmitter/receiver pair in the second transceiver 104. A transmitter TX and a receiver RX that are connected to the same channel/link, or two transceivers connected by the communication link 106, are considered "link partners." In accordance with the 10GBASE-T standard, the transmitters cooperate with precoders (not shown), and more specifically Tomlinson-Harashima precoders (THP) that apply THP coefficients to transmit signals to pre-compensate for channel imperfections and expected noise/distortion.

An interface 108 can be provided in the first transceiver chip 102 and an interface 110 can be provided in the second transceiver chip 104 to allow data transmissions between the transceivers to be routed to the appropriate transceiver blocks. For example, the interfaces 108 and 110 can include transformers, and circuitry used for directing signals or data (alternatively, some or all circuitry can be included in other components, such as transmitters TX and receivers RX).

For one embodiment, the interface 108 for each chip includes training logic 112 that manages and controls rapid retrain operations, as more fully explained below. The training logic associated with the interface 108 may be shared amongst the channels, or provided as separate resources for each of the transceiver channels.

Figure 2:
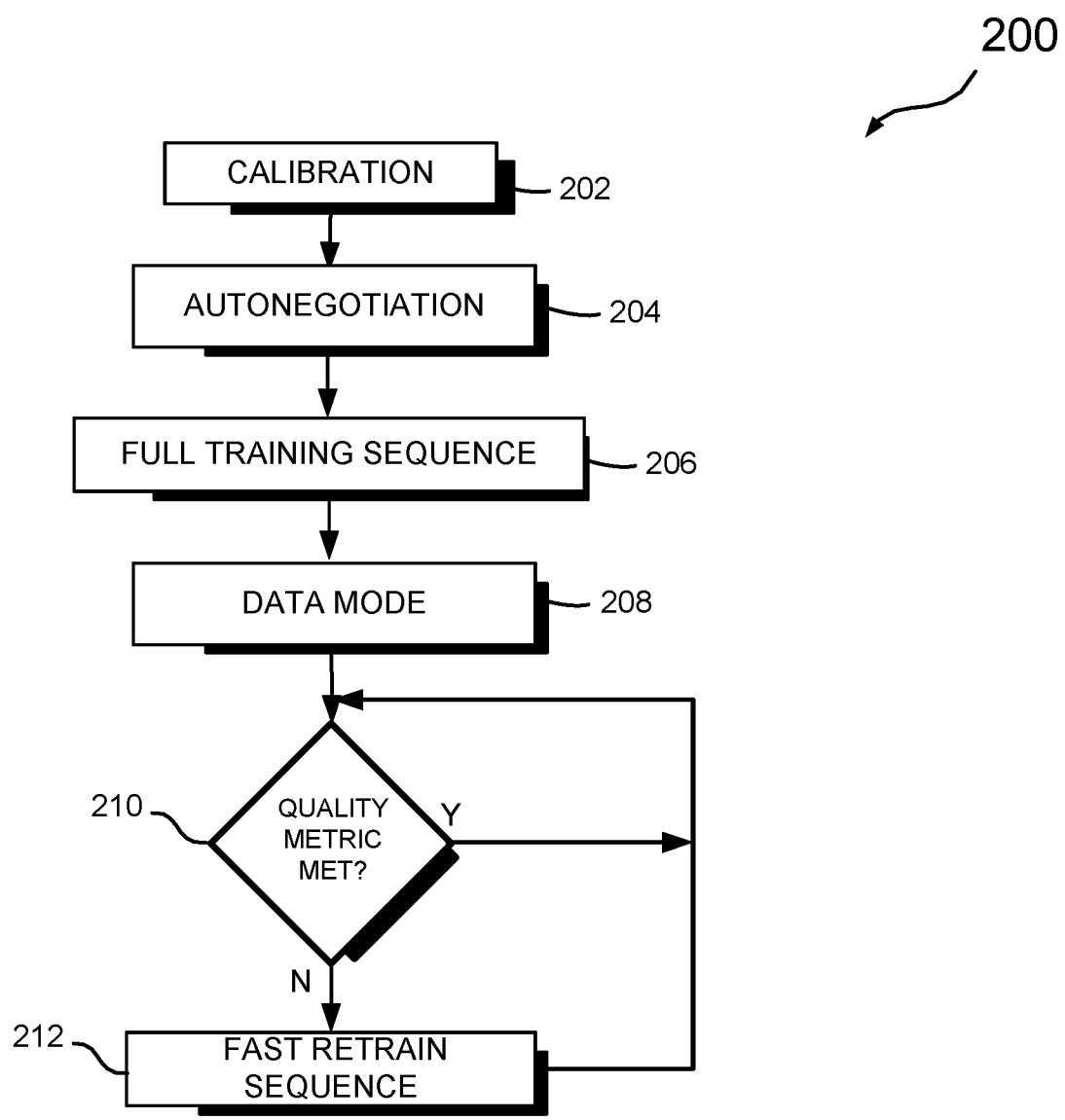
FIG. 2 illustrates a high-level flow diagram of general steps employed during operation of the Ethernet transceiver of FIG. 1.

Referring to FIG. 2, in one embodiment, the Ethernet transceiver 100 undergoes a full training prior to entering a data mode of operation. The full training involves a predefined sequence of stages or steps known by each of the link partners, although the boundaries of each step in the sequence may be overlapped or blurred in some embodiments. The sequence typically occurs at a predefined point of operation, such as at startup when a transceiver is powered on or is first connected to a communication link. During nominal operation, after the full training sequence, the transceiver continues to adapt parameters to changing characteristics of the link based on received data. However, some characteristics change so quickly that the receiver cannot adapt quickly enough, due to noise, interference, or other disturbances, which sometimes cause the loss of the link. In existing standards, the full training sequence is used to re-train transceiver parameters when a transceiver loses a communication link in a manner such that a fast retrain sequence cannot bring up the link.

Further referring to FIG. 2, the full training process, generally designated 200, may optionally first include a calibration process, at 202. The calibration process is typically not part of a communication standard, but is often employed to allow the transceiver components to operate near optimal condition. For example, the calibration process may include calibration of analog front end (AFE) components of the transceiver such as a digital-to-analog converter (DAC), line driver, low pass filter, gain stage, and analog-to-digital converter (ADC). For some embodiments, the calibration does not occur only in step 202, but may continue to occur during parts or all of the training or retraining sequence.

With continued reference to FIG. 2, the full training 200 includes an autonegotiation step, at 204. The autonegotiation step involves having the link partners communicate across the communication link to establish the common conditions under which normal data communication will operate. For example, the autonegotiation step can include determining which communication standard to use (10GBASE-T, NBASE-T, etc.), and determining which link partner will be the Master and which one will be the Slave (the Slave recovers timing information from the Master needed for communication). Additional information such as support for fast retrains may also be advertised between the link partners.

Following the autonegotiation step, full training-specific steps are then carried out, at 206, to properly adapt various filters. Depending on the embodiment, the full training sequence may involve PAM-2 signaling sequences, precoder coefficient determinations, and PAM-16 signaling sequences. Once the training sequences are complete, the link may enter a data mode of operation, at 208.

Operation of the link in a normal operation mode, after a full training sequence, often runs very well in transferring data at very high data rates without interruption. In some situations, however, extraneous noise such as crosstalk or interference may prevent the link from transferring data optimally. The link may monitor for extraneous noise by determining whether a quality metric is met, such as at 210. If detected noise is greater than a trigger threshold, then restoring the link to optimal operation may involve a fast retrain, at 212, which involves retraining the link with fewer steps than a full retrain, and which is far faster (on the order of 30 milliseconds, instead of two full seconds).

Figure 3:
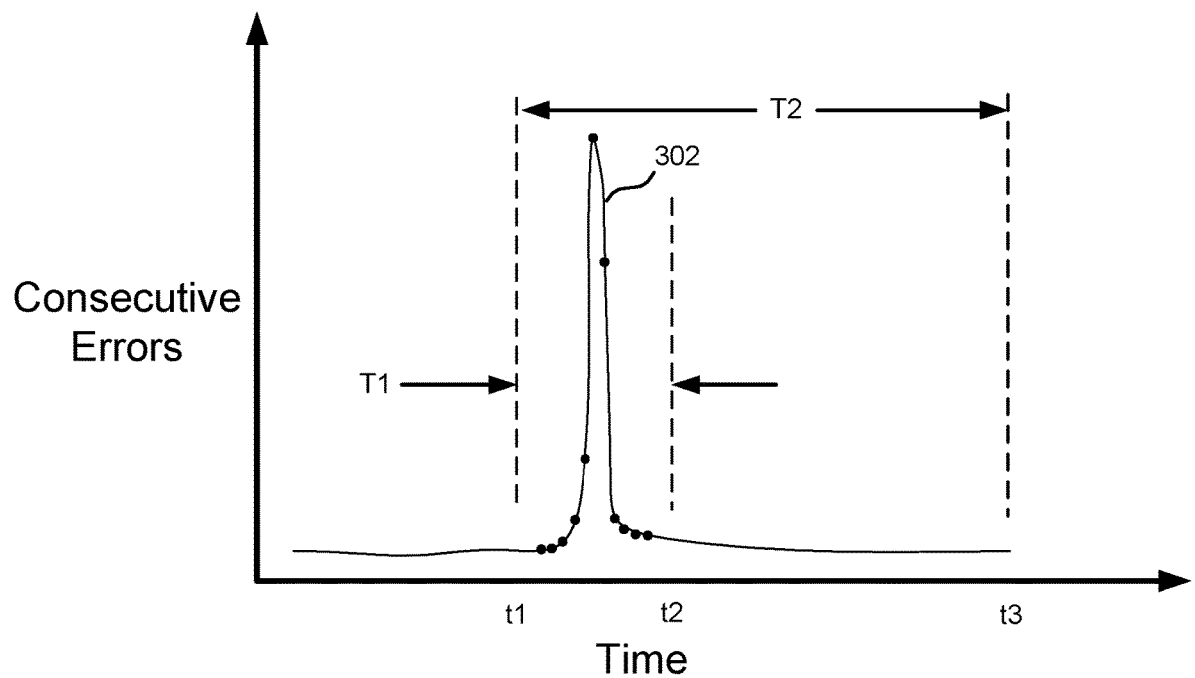
FIG. 3 illustrates a graph showing multiple time interval windows, and the numbers of consecutive errors during those windows.

Conventionally, a standardized fast retrain is triggered when forty consecutive frame errors are detected. At data rates of 10 Gbps and 5 Gbps, the forty consecutive frame errors may define a time window of approximately 320 ns. At a data rate of 2.5 Gbps, the forty consecutive frame errors may define a time window of approximately 640 ns. FIG. 3 illustrates a graph of frame error information versus time. The conventional consecutive error trigger may initiate a fast retrain due to a spike in errors, such as at 302, resulting from, for example, alien crosstalk caused by an RFI source adjacent an Ethernet cable. However, other more widely dispersed errors (referred to herein as "trickling error") may occur that may undesirably affect the link without causing a fast retrain to optimize the link. Further, some applications may successfully tolerate a short interval interrupt without the need for a fast retrain. In many circumstances, error information averaged over a user-programmed time interval provides a beneficial compromise in link error tolerance over an acceptable time interval.

Figure 4:
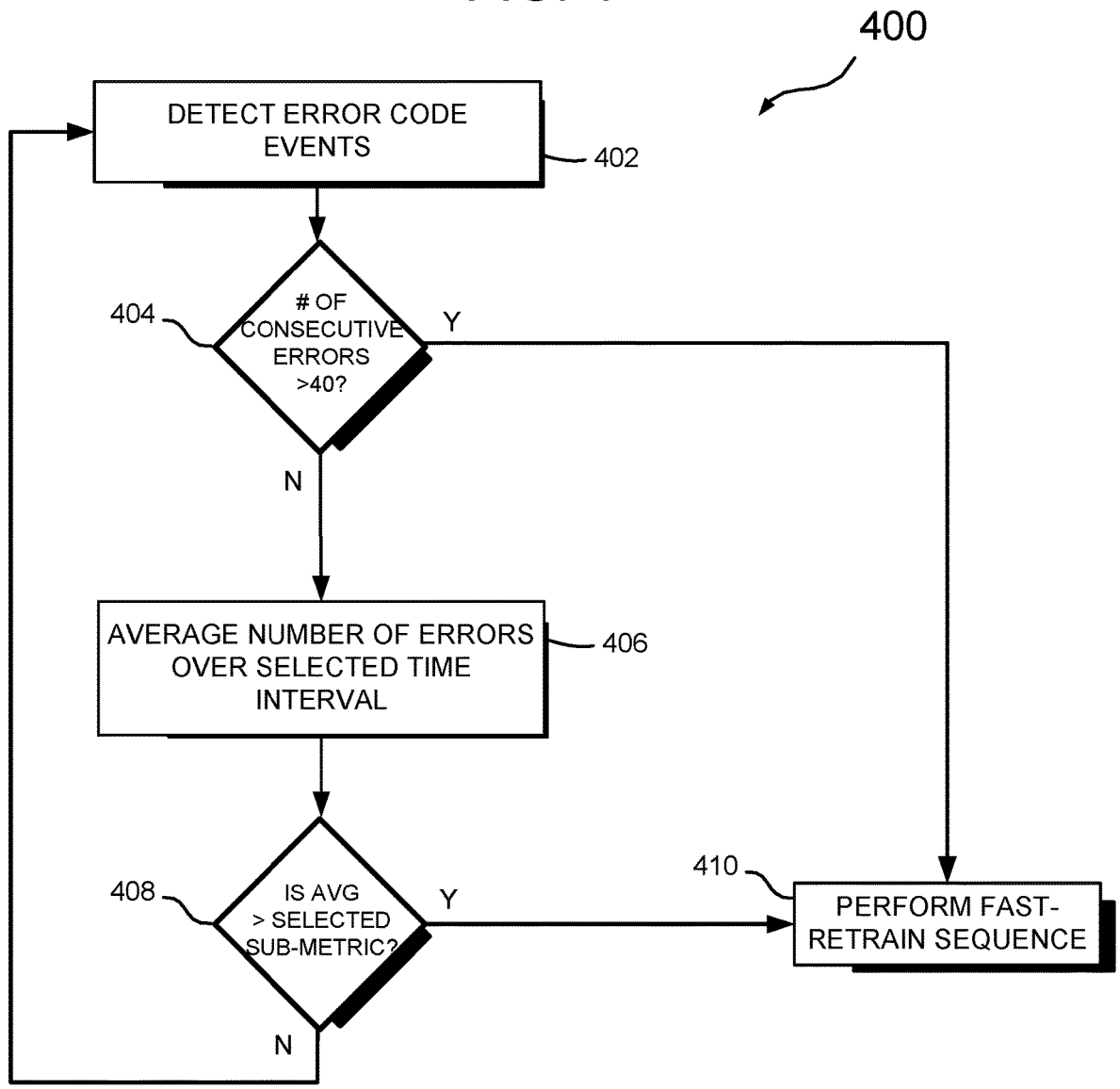
FIG. 4 illustrates a flowchart of steps for one embodiment of a method for performing a fast retrain sequence for a link based on an averaged trickling error.

Referring now to FIG. 4, one embodiment of a flexible fast retrain method, generally designated 400, provides a programmable trigger mechanism for fast retrains that balances the tolerance levels for different applications between short interrupt scenarios and relatively constant trickling error streams. The method generally runs during the data mode of operation, and involves detecting error information indicative of signal-to-noise ratio (SNR), at 402. For some embodiments, the error information may include one from a variety of error predictors or indicators, such as LDPC error codes, consecutive error frames, or LDPC loop iterations, to name but a few. For one embodiment, the IEEE standard fast retrain error threshold of 40 consecutive error frames may be employed as a worst-case threshold, at 404, in determining whether to initiate a fast retrain. Other embodiments may exclude this threshold entirely. If the worst-case threshold isn't met, then the detected error information may be averaged over a selected time interval, at 406. Referring back to FIG. 3, averaging the error information over a first time interval T1 such as between t1 and t2 results in a much higher value than an average of the error information over a second time interval T2 between t1 and t3. Having the flexibility to smooth the error detection process in this manner may add finer granularity to the fast retrain triggering process by providing a triggering threshold between a perfect channel and a worst-case error threshold.

Further referring to FIG. 4, once the averaging of the error information is complete, then it is compared to a pre-programmed sub-metric to determine whether a fast retrain should be initiated, at 408. If the value exceeds the sub-metric, then the fast retrain process begins, at 410. The steps involved in a fast retrain may involve one or more PAM2 sequences, PAM16 sequences, filter coefficient updating, etc., without the need for an autonegotiation process. One embodiment of a detailed fast-retrain process is described in copending U.S. patent application Ser. No. 16/362,479, entitled: "RAPID TRAINING METHOD FOR HIGH-SPEED ETHERNET," filed Mar. 22, 2019, owned by the assignee of the instant application, and expressly incorporated by reference in its entirety herein.

Those skilled in the art will appreciate the benefits and advantages provided by the embodiments described herein. By adding flexibility to the fast retrain triggering process, finer granularity and control in maintaining an optimal link may be achievable for a wider range of Ethernet applications.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A method of operation for an Ethernet transceiver, the method comprising:
    operating the Ethernet transceiver in a data mode;
    selecting a time interval for monitoring error information; and
    triggering a fast retrain sequence by
       detecting error information during the time interval,
       averaging at least two non-consecutive frame errors in the detected error information over the time interval to generate trickling error information,
       comparing the trickling error information to a selected threshold value, and
       performing the fast retrain sequence-based on the comparing.

2. The method according to claim 1, wherein the error information comprises an error predictor.

3. The method according to claim 1, wherein the error information comprises Low-Density Parity Check (LDPC) error code information.

4. The method according to claim 1, wherein the error information comprises LDPC loop iteration information.

5. The method according to claim 1, further comprising:
    operating the Ethernet transceiver in accordance with an NBASE-T Ethernet protocol.

6. The method according to claim 1, further comprising:
    prior to operating the Ethernet transceiver in the data mode, performing a full training sequence.

7. An integrated circuit (IC) Ethernet transceiver chip comprising:
    training logic to trigger a fast retrain sequence during a data mode, the training logic including
       error detection circuitry to detect error information,
       circuitry to average at least two non-consecutive frame errors in the detected error information over a user-selected time interval to generate trickling error information,
       comparison circuitry to compare the trickling error information to a selected threshold value, and
       circuitry to perform the fast retrain sequence based on the comparing.

8. The IC Ethernet transceiver chip according to claim 7, wherein the error information comprises an error predictor.

9. The IC Ethernet transceiver chip according to claim 7, wherein:
    the error detection circuitry comprises low density parity check (LDPC) decoding circuitry.

10. The IC Ethernet transceiver chip according to claim 7, wherein the error information comprises Low-Density Parity Check (LDPC) error code information.

11. The IC Ethernet transceiver chip according to claim 7, wherein the error information comprises LDPC loop iteration information.

12. The IC Ethernet transceiver chip according to claim 7, realized as an NBASE-T IC Ethernet transceiver chip.

13. A method of operation for an Ethernet transceiver, the method comprising:
    operating the Ethernet transceiver in a data mode;
    selecting a time interval for monitoring error information;
    establishing a consecutive frame error threshold and a trickling error threshold;
    detecting error information;
    averaging at least two non-consecutive frame errors in the error information over the time interval to generate trickling error information, and
    triggering a fast retrain sequence based on a comparison of the trickling error information during the time interval to the consecutive frame error threshold and the trickling error threshold.

14. The method according to claim 13, wherein the detecting error information comprises:
   detecting an error predictor.

15. The method according to claim 14, wherein the error predictor is based on a detected signal-to-noise ratio (SNR) along a channel coupled to the Ethernet transceiver.

\* \* \* \* \*